United States Patent [19]
LaSarge

[11] 3,941,001
[45] Mar. 2, 1976

[54] GIMBAL CONTROL MECHANISM

[75] Inventor: Eugene A. LaSarge, Grandville, Mich.

[73] Assignee: Lear Siegler, Inc., Grand Rapids, Mich.

[22] Filed: Nov. 9, 1973

[21] Appl. No.: 414,260

[52] U.S. Cl................................ 74/5.2; 74/5.4
[51] Int. Cl.².......................................... G01C 19/04
[58] Field of Search...................... 74/5.2, 5.4, 5.41

[56] References Cited
UNITED STATES PATENTS

| | | | |
|---|---|---|---|
| 2,846,887 | 8/1958 | Chombard | 74/5.2 |
| 2,934,960 | 5/1960 | Chombard | 74/5.2 |
| 3,363,473 | 1/1968 | Chombard et al. | 74/5.4 |
| 3,470,752 | 10/1969 | Hildebrand et al. | 74/5.2 |

*Primary Examiner*—Charles J. Myhre
*Assistant Examiner*—William C. Anderson

[57] ABSTRACT

A control mechanism to dampen gimbal tumbling and to orient the axes of rotation of the rotor and the gimbals of a gyroscope when in an inoperative state. The control mechanism serves as an overriding stop to gimbal lock, dampens the gimbal rotation leading to tumbling and restores the gimbals to a given orientation upon the cessation of gimbal rotation. The overriding stop and dampening force in one embodiment are the plurality of cams and cam followers rotatably mounted and operatively connecting the inner and outer gimbals with the gyroscope frame, and in another embodiment a cam and cam follower arrangement rotatably mounted and operatively connecting the inner and outer gimbal in combination with a bearing surface operatively connecting the inner and outer gimbal with the gyroscope frame.

10 Claims, 4 Drawing Figures

GIMBAL CONTROL MECHANISM

SUMMARY OF THE INVENTION

In essence, the invention provides a force to resist gimbal rotation leading to gimbal lock and to dampen gimbal tumbling and also a force to restore the gimbals to a given orientation with respect to one another and with the rotor spin axis upon the deterioration of the torque inducing rotor rotation.

The gimbal control mechanism for vertical gyroscope consists of one cam and cam follower arrangement between the inner and outer gimbals and another between the outer gimbal and gyroscope frame. The cams being so contoured as to engage the cam follower when the angular displacement of the respective gimbals exceeds a predetermined angular relationship.

The resisting force is induced on the engaged cam follower by the respective cam rise which force continues to increase until the peak or apex of the cam is reached (i.e., a 180° displacement from the normal operating reference point on the cam). The restoring force is induced in the engaged cam follower by the respective cam fall which force continues to decrease until the return of the cam to the predetermined angular relationship which force continues to decrease until the return of the cam to the normal angular displacement. The cam mounted in a fixed angular relationship to the inner gimbal and the cam mounted in a fixed angular relationship to the outer gimbal both operate with their respective cam followers as aforementioned, and also operate in a generally orthogonal space relationship to one another.

The gimbal control mechanism for the directional gyroscope consists of a cam and cam follower arrangement between the inner and outer gimbals and a braking arrangement consisting of a bearing surface mounted on the gyroscope frame for abutment by the stem end of the cam follower means mounted in the outer gimbal. The braking arrangement allows the outer gimbal a 360° rotation and is only effective when the inner and outer gimbal approach gimbal lock relationship and together seek to rotate about the major axis.

It is the object of the invention to dampen random gimbal rotation and thereby protect the gimbals during power-off rotor coast-down.

Another object of the invention is to provide a gyroscope with means to restrain gimbal rotation and tumbling induced by violent and accelerated external forces acting upon the gyroscope.

Still another object of the invention is to provide a means to allow the gimbals of the gyroscope to pass through the gimbal lock position and thereafter seek to orient the gimbals to a given spin axis orientation after the gyro rotor has coasted to a quiescent state.

Other objects and advantages of the invention will become apparent from the following specification taken in connection with the accompanying drawings wherein:

BACKGROUND OF THE INVENTION

The invention relates to a gimbal control mechanism to resist gimbal rotation about the major axis when the gyroscope approaches gimbal lock position and thereafter orients the gimbals and the spin axis of the gyroscope preparatory to the erecting or leveling as a condition precedent to reapplying power to the gyroscope rotor.

Gyroscopes are used to indicate angular rotation about the three principal control axes and are referred to as vertical gyroscopes and directional gyroscopes. Vertical gyroscope, whose starting sequence first requires erecting the gyro rotor spin axis, indicates pitch and roll, while the directional gyroscope, whose starting sequence first requires leveling the gyro rotor spin axis, indicates azimuth or yaw. The gyroscopes are completely free to rotate in the gimbal supports. Such gyroscopes have, however, a distinct disadvantage i.e., gimbal lock. Gimbal lock being defined as that condition which exists when the inner gimbal of the gyroscope rotates through such an angle about the inner gimbal axis that the spin axis of the rotor and the outer gimbal axis mounted in the frame supports are aligned. To avoid gimbal lock, a fixed stop means, situated to operate between the inner and the outer gimbal, was developed. Consequently, as the fixed stop means is engaged during a maneuver tending to swing the gyroscope to or through the gimbal lock position, torques are developed which quickly rotate the outer gimbal around, thereby circumventing gimbal lock and leaving the gyroscope free to rotate relative to the inner gimbal without further interference from the stop means. However, violent or rapid movements of the frame of the gyroscope cause accelerated angular deviations between the inner gimbal, and outer gimbal, so that the inner gimbal strikes the fixed stop with a highly intensive force. When this occurs, a very large torque is developed, causing the outer gimbal to tumble or upset.

The phenomenon of violent and rapid movement of the frame is particularly apparent when the gyro is of the type used for torpedoes, and the torpedo after its run and, with all power off, is coasting to the surface during the recovery cycle. As the result of power off, the steering vanes of the torpedo are skewed in a particular manner, causing the torpedo to pitch up and rotate with a high angular velocity.

The gyro, if equipped with a fixed stop means to prevent gimbal lock and gimbal tumbling, will, as a consequence, undergo accelerated precessional effects. These precessional effects will become particularly more rapid and cause breakage and damage to the gyro gimbals and bearings as the gyro rotor loses angular momentum during coast-down time.

The gyro resistance to external forces is dependent upon the angular momentum of the gyro rotor and this resistance is known as rigidity or stability. As the result of loss of rigidity or stability along with the aforementioned combination of external force, the gyro will undergo a sequence of violent and damaging rotations and tumbling, with resulting breakage of gyro gimbals and destruction of gimbal bearings.

BRIEF DESCRIPTION OF THE DRAWINGS

FIG. I illustrates the Directional Gyroscope with the gimbal brake and the gimbal overriding stop arrangements in a co-acting relationship.

FIG. II illustrates a Direction Gyroscope of FIG. I, provided with the combination gimbal overriding stop operatively connecting the inner and outer gimbals, and a gimbal brake operatively connecting the outer gimbal and gyro frame.

Figure 1:
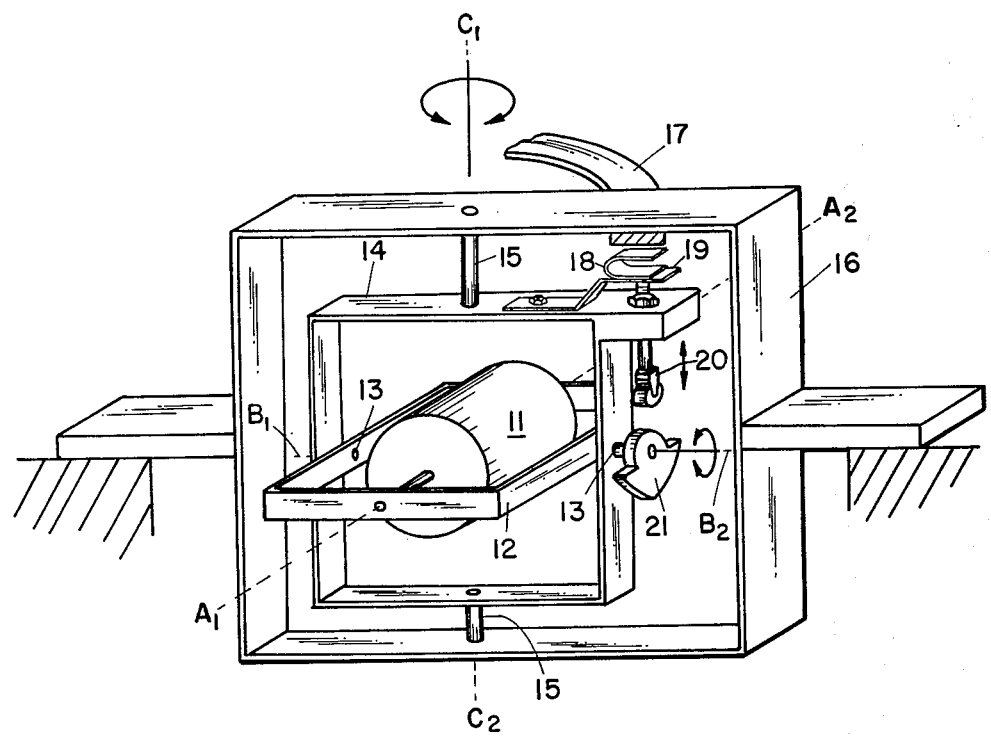
Figure 2:
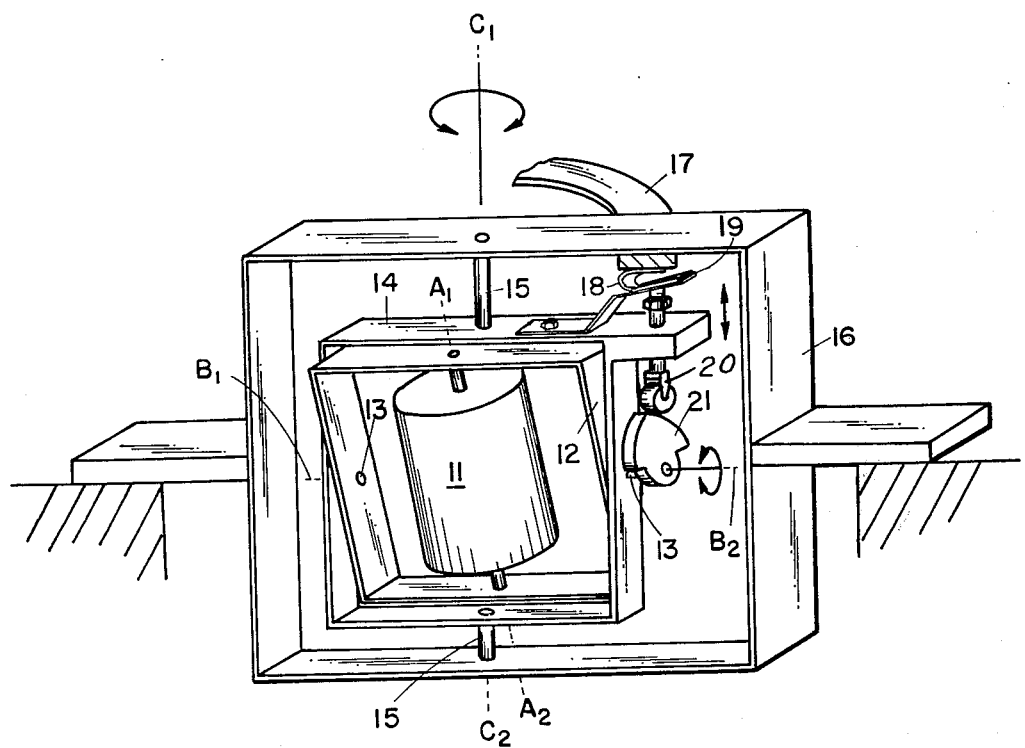
Figure 4:
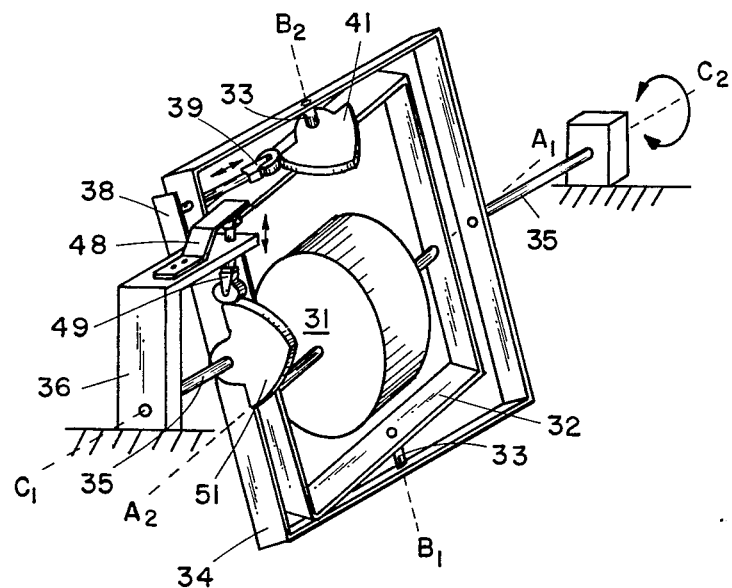
Figure 3:
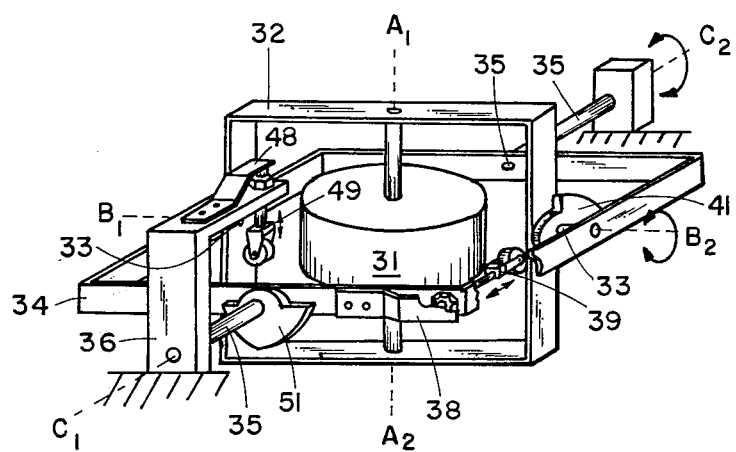

FIG. III illustrates the Vertical Gyroscope with the plurality of gimbal overriding stops in a co-acting relationship.

FIG. IV illustrates a Vertical Gyroscope of FIG. III, provided with a plurality of gimbal overriding stops operatively connecting the inner and outer gimbals and the gyro frame.

Referring first to the Directional Gyroscope shown in FIGS. I and II, The rotor 11 is mounted in the inner gimbal 12 for rotation about the spin axis $A_1-A_2$. The rotor 11 is driven by any suitable electric or pneumatic motor means not shown. The inner gimbal 12 is supported by trunnions 13 rotatably journaled in the outer gimbal 14 so that the inner gimbal 12 is free to pivot or rotate about the minor axis $B_1-B_2$. The outer gimbal 14 is supported by trunnions 15 rotatably journaled in the frame 16 so that the outer gimbal 14 is free to rotate about the major axis $C_1-C_2$.

Due to the gyroscopic property of rigidity or stability, the spin axis $A_1-A_2$ of the gyroscope, when operative, tends to stay in a horizontal orientation, with the outer gimbal 14 stabilized with reference to the rotative movements of the frame 16.

An embodiment of gimbal control mechanism is the combination of gimbal overriding stop and gimbal brake shown in both FIGS. I and II. The gimbal overriding stop consists of a cam means 21 mounted in a fixed angular relationship with the inner gimbal 12 to rotate therewith about the minor axis $B_1-B_2$ and a cam follower means 20 loaded at one end by spring means 19. The gimbal brake means consists of circular bearing surface 17, fixedly mounted in the frame 16, and a spring insert 18 adapted for abutment with the spring means 19 upon the instance of the cam follower 20 being raised with a force exceeding the force of the spring means 19.

The operation of the gimbal control mechanism adapted to the horizontal gyroscope can be best understood by referring to FIG. II. The contour of the cam means 21 is designed to engage the roller of the cam follower 20 whenever the angular displacement of the spin axis $A_1-A_2$ exceeds the vehicle pitch angle maneuver capability. (In the torpedo application, the pitch angle maneuverability during normal operation is limited to ±65.) As the cam rotates through the arc beyond the predetermined area of angular displacement, and to the apex or peak of the cam, the cam contour will raise the cam follower 20 against its spring means 19. The spring means, in turn, will induce an increasing downward force tending to oppose the rotation of the cam. As the cam rotates through the arc beyond the cam apex or peak, the cam contour will drop the cam follower 20 from under the spring means 19. The spring means thereby induces a decreasing downward force tending to assist the rotation of the cam.

In the event the force induced by the torque of rotation exceeds the spring induced force, then the stem end of cam follower 20, through spring insert 18, will abut against the circular bearing surface 17 to create a braking force against further rotation of the cam.

If the sum of the net braking force and spring force exceed the force induced by the torque, then the cam rotation will be opposed and, depending upon differential of forces, the cam eventually will be reoriented to return to within the predetermined range of angular displacement.

However, if the net sum of braking and spring force is insufficient, then the cam will override that combination of forces and continue to rotate with the respective gimbal through gimbal lock condition, which is represented by the apex or peak of the cam contour. However, after overriding the apex or peak of the cam, the cam contour will permit the cam follower to be lowered, and combination of force will act to assist rotation of the cam to the return within the predetermined range of angular displacement of the attached gimbal.

During the coast-down time of the gyro rotor, and prior to the dormant state, as well as during the time prior to the torpedo becoming buoyant and floating on the surface, the foregoing gimbal movements will be oscillating to and through gimbal lock and to and through the predetermined angular displacement. This oscillation will become less frequent as the dormant state of the gyro rotor and the rest state of the torpedo is approached, until finally the gimbals by reason of the cam contour, will be oriented in a generally orthogonal relationship, one to the other.

Referring to the Vertical Gyroscope shown in FIGS. III and IV, the rotor 31 is mounted in the inner gimbal 32 for rotation about the spin axis $A_1-A_2$. The inner gimbal 32 is supported by trunnions 33 rotatably journaled in the outer gimbal 34 so that the inner gimbal 32 is free to pivot or rotate about the minor axis $B_1-B_2$. The outer gimbal 34 is supported by trunnions 35 mounted on frame 36 so that the roll gimbal is free to rotate about the major axis $C_1-C_2$. The gyroscope, when operative, tends to maintain the orientation of its spin axis $A_1-A_2$ in the vertical direction. Pitch movements are indicated by rotation of the trunnions 33 relative to the outer gimbal 34, and roll movements by rotation of trunnions 35 relative to the frame 36.

An embodiment gimbal control mechanism is shown in FIGS. III and IV, and consists of cams 41 and 51 mounted on the minor axis $B_1-B_2$ and the major roll axis $C_1-C_2$ respectively, in fixed angular relationship with the inner or outer gimbal, with cam followers 39 & 49 respectively, mounted for reciprocal movement on either the outer gimbal or the frame, and loaded by the respective springs 38 and 48.

The operation of the gimbal control mechanism adapted to the horizontal gyroscope can best be understood by referring to FIG. IV.

The initial relationship of the gimbals, one to another, shown in FIG. IV is generally orthogonal. This relationship deviates from the orthogonal within the range of the predetermined angular displacement (±65°). Consequently, a torque tending to rotate one gimbal will have a component tending to rotate the other gimbal whenever the angular displacement of the respective cam is such as to engage the respective cam follower. Consequently, through the cam and cam follower, an operative connection is established between the gimbal and with the frame whenever any one of the gimbals is outside of their predetermined angular displacement or pitch angle capability.

The cam and cam follower will interact in the fashion similar, as discussed above. However, by reason of the plurality of cams and cam follower, the torque inducing rotation will be opposed or assisted by the combined force of the said cams. Again, as the gyro rotor coasts to a dormant condition and the torpedo becomes buoyant and floats, the respective gimbal and frame will, by reason of the interaction of cam and cam follower, reorient in a generally orthogonal relationship one to another.

While a preferred form of the invention has been described, it should be understood that the same may be altered in detail and in relative arrangement of parts within the scope of the appended claim.

What is claimed as new and desired to be secure by Letters Patent is:

1. A gimbal control mechanism for a gyroscopic system having a horizontal spin axis for indicating deviations in asimuth or yaw said gyroscopic system comprising in combination a rotor mounted in an inner gimbal for rotation about the spin axis, an outer gimbal containing said inner gimbal mounted therein for rotation about the minor axis, and a frame member containing said outer gimbal mounted therein for rotation about the major axis, the said minor axis being substantially at right angles to both the spin and major axes with the said major axis substantially at right angles to the spin axis; and said gimbal control mechanism comprising in combination a cam means mounted in fixed angular relationship with the said inner gimbal for rotation about the minor axis, a cam follower means having a roller end and a protruding stem end mounted in the said outer gimbal for reciprocal movement parallel to the major axis and situated to engage the cam means by the said roller end, and a bearing surface mounted within the said frame member and aligned for abutment by the protruding stem end of the said cam follower means throughout the rotation of the said outer gimbal about the major axis, whereby the interaction of the said cam means, said follower means and said bearing surface generates a force to oppose rotor tumbling and gimbal lock, with the intensity of the generated force varying sinusoidally as determined by the contour of the said cam means from a minimum when the spin axis and major axis are perpendicular to each other and to a maximum when the said axes coincide.

2. A gimbal control mechanism as recited in claim 1 wherein the braking action between the said outer gimbal and frame member is effected by the raised protruding stem of the said cam follower means abutting on the said bearing surface through the spring insert means.

3. A gimbal control mechanism as recited in claim 1 wherein the said cam follower means is positioned and held in place by the force developed in a spring means.

4. A gimbal control mechanism recited in claim 1 wherein the said cam means is heart-shaped and the contour limits engagement by the roller of the said cam follower means through the arc representing angular displacement in excess of the predetermined angular range.

5. A gimbal control mechanism recited in claim 1 wherein the resisting force arrangement comprises an overriding stop means mounted on the inner gimbal and means on the outer gimbal for engagement of said overriding stop means through the arc representing angular displacement in excess of a predetermined range.

6. A gimbal control mechanism for a gyroscopic system having a vertical spin axis for indicating deviations in pitch and roll said gyroscopic system comprising in combination a rotor mounted in an inner gimbal for rotation about the spin axis, an outer gimbal containing said inner gimbal mounted therein for rotation about the minor axis, and a frame member containing said outer gimbal mounted therein for rotation about the major axis, the said minor axis being substantially at right angles to both the spin and major axes with the said major axis substantially at right angles to the spin axis; and said gimbal control mechanism comprising in combination a first cam means mounted in fixed angular relationship with the said inner gimbal and rotatable therewith about the minor axis, a first cam follower means mounted for reciprocal movement in the said outer gimbal and situated to be engaged by the said first cam means, a second cam means mounted in fixed angular relationship with the said outer gimbal and rotatable therewith about the major axis, a second cam follower means mounted for reciprocal movement in the frame member and situated to be engaged by the said second cam means;

whereby during gyro rotor coast down with attendant loss of gyro stability, external torques inducing precessional effects are opposed by the coaction of the plurality of cam and follower means with the first cam and first follower means tending to return and retain the said inner gimbal in a given angular relationship with respect to the said outer gimbal and the second cam and second follower means tending to return and retain the said outer gimbal in a given angular relationship with respect to said frame member so that upon completion of gyro rotor coast down the substantial right angle relationship of the minor axis with both the spin axis and major axis and the substantial right angle relationship of the major axis with the spin axis is reestablished.

7. A gimbal control mechanism as recited in claim 6 wherein the said first and second cam follower means are positioned and held in place by a force developed by a spring means.

8. A gimbal control mechanism as recited in claim 6 wherein the said first and second cam means are heart-shaped and the contour limits engagement with the rollers of the first and second cam follower means through the arc representing angular displacement in excess of the predetermined angular range.

9. A gimbal control mechanism recited in claim 6 wherein the resisting force arrangement comprises an overriding stop means mounted on both of the said inner and outer gimbals and means on the said outer gimbal and said gyroscope frame for engagement with said overriding stop means through the arc representing angular displacement in excess of the predetermined range.

10. A gimbal control mechanism recited in claim 6 the first and second combination of cam means and cam follower means is responsive to abnormal deviations between the inner and outer gimbals and the gyro frame for damping the torque tending to tumble the inner and outer gimbal when aligned in the same plane.

* * * * *